Dec. 14, 1948.  J. J. STADTHERR  2,456,338
CATALYTIC POLYMERIZATION OF OLEFINIC HYDROCARBONS
Filed March 26, 1945  2 Sheets—Sheet 2

INVENTOR.
John James Stadtherr
BY
Edward H. Lang
ATTORNEY.

Patented Dec. 14, 1948

2,456,338

UNITED STATES PATENT OFFICE 2,456,338

CATALYTIC POLYMERIZATION OF OLEFINIC HYDROCARBONS

John J. Stadtherr, Newark, Ohio, assignor to The Pure Oil Company, Chicago, Ill., a corporation of Ohio Application March 26, 1945, Serial No. 584,979

9 Claims. (Cl. 260—683.15)

This invention relates to the selective catalytic polymerization of olefinic hydrocarbons to hydrocarbons boiling within the gasoline boiling range.

Methods are well known for selectively polymerizing $C_4$ olefins by passing such olefins over a solid polymerizing catalyst such as kieselguhr impregnated with phosphoric acid, and dried. The polymer obtained in this process after hydrogenation is a high grade aviation blending stock.

I have discovered that if stabilizer gases separated from cracked gasoline are separated into $C_3$ and lighter, $C_4$ and $C_5$ fractions, the $C_3$ and lighter and $C_5$ fractions can be recombined and polymerized separately from the $C_4$ fraction to give a polymer, which upon hydrogenation results in a high grade aviation gasoline, and that the reaction product from the polymerization of the combined $C_3$ and $C_5$ fractions can be used to heat the $C_4$ fraction sufficiently to selectively polymerize it without the necessity of supplying additional heat thereto.

An object of the invention is to provide an improved method for polymerizing mixed olefinic gases.

Another object of the invention is to provide a selective method for polymerized mixed olefins in order to obtain increased yields of aviation gasoline.

Still another object of the invention is to provide a selective method for polymerizing olefin hydrocarbons in which the heat content of the reaction product from one stage is used to heat the charging stock in a separate polymerization stage.

Figure 1:
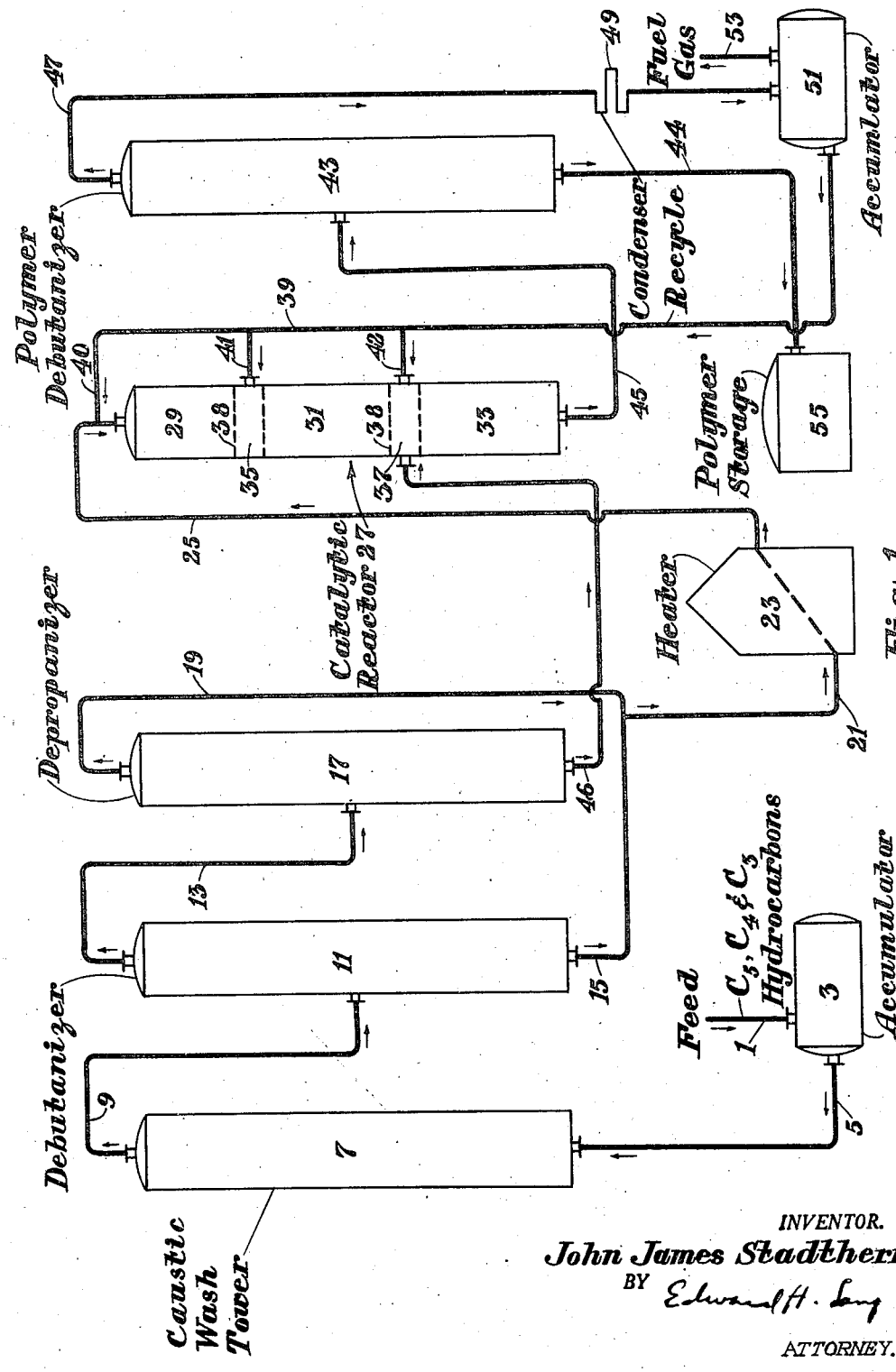
Figure 2:
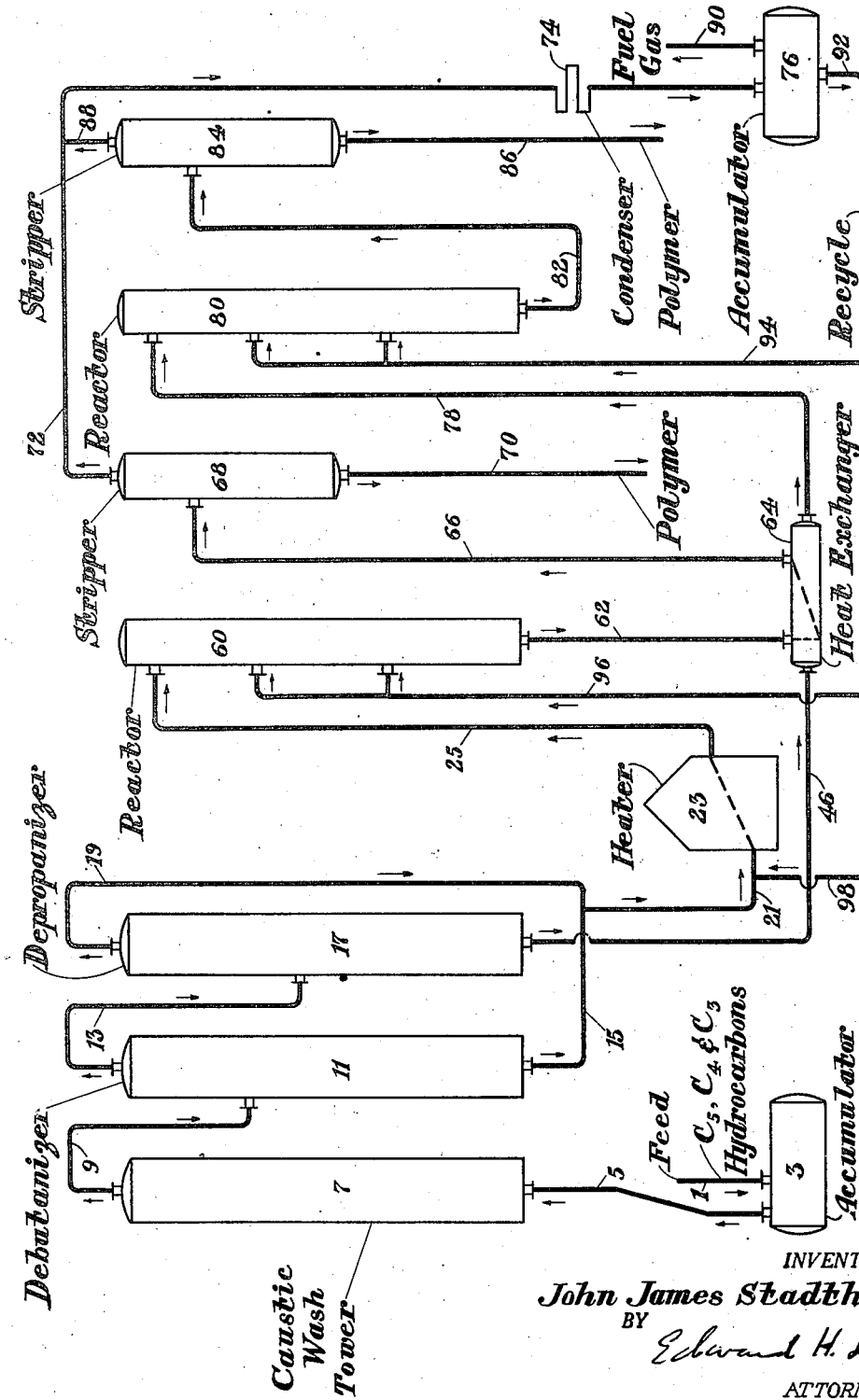

Other objects of the invention will become manifest from the following description and accompanying drawings in which Figure 1 is a flow sheet showing apparatus suitable for carrying out the invention; and Figure 2 is a flow sheet of apparatus for carrying out a modification of the invention.

It should be understood that in both Figures 1 and 2 auxiliary equipment, such as pumps, compressors, valves and coolers, have been omitted.

Referring to Figure 1, numeral 1 indicates a feed line through which liquefied gas containing $C_2$, $C_3$, $C_4$ and $C_5$ olefins, as well as $C_3$, $C_4$ and $C_5$ and lower molecular weight paraffins, is charged to an accumulator 3. The gas charged through feed line 1 may be stabilizer gas from an oil cracking operation, either thermal, catalytic or a combination thereof. Cracked stabilizer gas may have the following approximate analysis:

| | |
|---|---|
| $CH_4$ | 6.0 |
| $C_2$ hydrocarbons | 19.2 |
| $C_3$ hydrocarbons | 34.2 |
| $C_4$ hydrocarbons | 35.6 |
| $C_5$ hydrocarbons | 5.0 |

It will be understood, however, that the analysis will vary with the type of operation in which the gas is produced. From the accumulator 3 the liquefied gas is charged through line 5 to a caustic wash tower 7 in order to remove hydrogen sulfide and any low boiling mercaptans which may be contained therein. An aqueous sodium hydroxide solution containing from 15 to 20% of sodium hydroxide is suitable for use in the wash tower. Contact between the liquefied gas and caustic soda solution may be countercurrent, with cyclic circulation of the caustic soda solution, and the caustic washed gas may be water washed and settled in a suitable settler not shown. The washed liquefied gas leaves the top of the tower 7 through line 9 and is charged into the intermediate zone of a debutanizer 11 under a pressure of approximately 300 to 450 pounds per square inch. In tower 11 $C_2$, $C_3$ and $C_4$ hydrocarbons are vaporized and leave the top of the tower through line 13. The remaining liquid portion of the charging gas which now is composed chiefly of $C_5$ hydrocarbons leaves the bottom of the debutanizer through line 15 at a temperature of approximately 330° F. The mixture of gases passing through line 13 and composed chiefly of $C_2$, $C_3$ and $C_4$ hydrocarbons enters intermediate portion of depropanizer 17 which is also maintained at a pressure of between approximately 300 and 450 pounds per square inch. In the depropanizer 17 $C_3$ and lighter hydrocarbons are separated from $C_4$ hydrocarbons, $C_3$ and lighter hydrocarbons being withdrawn from the top of the tower through line 19 and the $C_4$ hydrocarbons being withdrawn from the bottom of depropanizer 17 through line 46 at a temperature of about 260° F. The gases in line 19 are preferably condensed to liquid and then pumped under a pressure of 300 to 1000 pounds per square inch, or more, in admixture with the C₅ hydrocarbons from line 15, through line 21 to heater 23. It will be understood that it is not necessary to condense the C₃ and lighter hydrocarbons before they enter the heater, but if they are not condensed they must be compressed to a pressure sufficiently high to force them to the heater at the desired pressure.

In the heater 23 the mixed C₃ and lighter and C₅ fractions are heated to a temperature of 400 to 450° F. and passed through line 25 to the top of the catalytic reactor 27. The catalytic reactor is composed of three separate superimposed catalytic beds 29, 31 and 33 separated by spaces 35 and 37. The catalyst in each bed is a suitable solid polymerizing catalyst, preferably of the phosphoric acid type, prepared by impregnating a solid adsorbent, such as kieselguhr, with phosphoric acid, drying the resulting material and forming it into pellets. This type of catalyst is well known and is widely used in industrial polymerization installations.

Other solid polymerization catalysts such as copper pyrophosphate supported on activated carbon may be used.

The catalyst in each bed is supported by a perforated plate 38 through which gases and liquids can pass from one bed or stage to another. It should be understood that the individual catalyst beds can be located in separate towers if desired.

Although the size of each catalyst bed may vary, I prefer to have the top catalyst bed 29 of such size with relation to the volume of charging stock thereto that the space velocity—that is, the number of gallons of charging stock per hour, divided by the number of pounds of catalyst in the bed—is approximately 0.1 to 0.3. The size of the middle bed 31 should be such that the space velocity is approximately 0.2 to 0.4, based on the total liquid gallons passing therethrough. I prefer to have the bottom bed 33 of such size that the space velocity based on total liquid products passing therethrough is approximately 0.2 to 0.4.

The products leaving the bottom of the catalytic reactor bed 29 pass into the space 35 wherein they are mixed with recycle stock which may be at a temperature of approximately 80° to 100° F. The recycle stock may be recycled through line 39 and connecting lines 40, 41 and 42 to either the top of reactor 27, or to the space 35, or to the space 37; or the recycle may be split and charged as required to all three points. Suitable means should be provided in the spaces 35 and 37 to obtain effective mixing of the recycle stock with the products leaving the beds 29 and 31. Suitable mixing may be effected by providing a helical baffle in the space 35 and injecting the recycle stock tangentially along the inside wall surrounding the space 35 and 37. The amount and temperature of the recycle stock charged to the space 35 is adjusted so that the temperature of the resulting mixture entering the middle catalytic bed 31 is approximately 375° to 425° F. If desired, the recycle stock 39 may be heated somewhat before being recycled to the space 35 by indirect heat interchange with the debutanized polymer leaving the polymer debutanizer 43 through line 44; or by heat interchange with reaction products leaving the catalytic bed 33 through line 45; or by heat interchange with both these materials.

The reaction products leaving the middle catalytic bed 31 are mixed in space 37 with the C₄ fraction withdrawn through line 46 from de-propanizer 17. Recycle may also be fed into space 37 from line 39 through line 42. Space 37 is provided with a suitable mixing device similar to that of space 35. The C₄ fraction at a temperature of approximately 260° F., the recycle and the reaction product from bed 31 are mixed in such proportions as to attain a temperature of 300° to 375° F. At this temperature the mixture passes through the bottom catalytic bed or zone 33.

Pressure maintained in all three catalytic beds will be approximately 300 to 1000 pounds per square inch or more, and preferably from about 550 to 900 pounds per square inch. A pressure drop of approximately 50 to 70 pounds per square inch will occur from the top to the bottom of reactor 27. From the bottom of the reactor the total reaction product passes through line 45 to an intermediate point in polymer debutanizer 43 in which C₄ and lighter hydrocarbons are removed overhead through line 47, passed through condenser 49 and into accumulator 51. Pressure on the system is maintained in the accumulator. Any gas which does not condense in the accumulator is withdrawn through line 53. Liquefied gas in accumulator 51, composed chiefly of C₃ hydrocarbons, with some C₄ hydrocarbons, is withdrawn through line 39 and recycled as before described. To lend flexibility to the system the recycle line 39 is so connected that recycle may be divided in any desired portions for return to spaces 35 and 37 and to the top of reactor 27; or the entire recycle may be returned to any one part.

The debutanized polymer is withdrawn from the bottom of debutanizer 43 through line 44 to polymer storage 55.

By operating in the manner above described, C₃ and C₅ olefins with some C₂ olefins are polymerized under conditions which are most suitable to their polymerization, and the C₄ hydrocarbons are separately polymerized under conditions most suitable for their polymerization. At the same time the sensible heat and exothermic heat of reaction of the C₂, C₃ and C₅ polymerization step is utilized to heat recycle stock to the temperature most effective for its polymerization, and the sensible heat and exothermic heat of reaction from the combination of recycle and C₂, C₃ and C₅ polymerization is used to heat C₄ fraction to the temperature most effective for its polymerization, thereby avoiding separate heating of each fraction subjected to polymerization. Moreover, the products leaving zone 29 and 31 are quenched to a temperature below active polymerization temperature thereby preventing overpolymerization.

Figure 2 shows apparatus for carrying out a modification of the invention in which the heat of reaction from one stage is utilized to heat the charge for a separate stage by indirect heat interchange, thereby enabling the products from each stage to be separately collected. The elements 1, 3, 5, 7, 9, 11, 13, 15, 17, 19, 21, 23, 25 and 46 are the same as in Figure 1. The mixture of C₂, C₃ and C₅ fractions heated to approximately 400°–450° F. under a pressure of approximately 300 to 1000 pounds per square inch or more, enter the top of catalytic reactor 60 through line 25 and pass downwardly through the catalyst in the reactor. The reaction products leave the bottom of the reactor through line 62 and pass through heat interchanger 64 and line 66 to an intermediate point in stripper 68 where the polymer is separated from the unpolymerized gases. The polymer leaves the bottom of the stripper through line 70 and the gas is passed overhead through line 72 and condenser 74 to accumulator 76.

The C₄ fraction from the bottom of tower 17 passes through line 46, heat exchanger 64 and line 78 to the top of a second catalytic reactor 80. In the heat interchanger 64 the C₄ fraction is heated by means of indirect heat interchange with the reaction products leaving reactor 60 to a temperature of approximately 300° to 375° F. The C₄ fraction will pass downwardly through catalytic reactor 80 and the reaction products in the bottom pass through the line 82. From the line 82 the reaction products pass into an intermediate point of stripper 84 where polymer is separated from the unreacted gas. The polymer is withdrawn from the stripper 84 through line 86 and the unreacted gas leaves the top of stripper 84 through line 88 joining gases from stripper 68.

Combined gases from the strippers 68 and 84 pass through condenser 74 to accumulator 76. Any uncondensed gas leaves the accumulator 76 through line 90. Liquefied gas is withdrawn from accumulator 76 through line 92 and may be recycled through either lines 94, 96 or 98, or may be divided in any desired proportion as required to maintain the desired temperatures in the reactors 60 and 80. The recycled gas is preferably injected into the reactors 60 and 80 at a plurality of points along the length of the reactor in order to maintain the temperature in the reactor within the desired limit of temperature range. Recycle gas in excess of that required to keep the temperature in the reactor within the desired range is recycled to the heater.

Recycle stock may be heated, if desired, by heat interchange with gases and/or polymers leaving the strippers 68 and 84.

It will be seen that in accordance with the method of operation of Figure 2, the combined C₂, C₃ and C₅ fractions on the one hand, and the C₄ fraction on the other, are separately polymerized under conditions most favorable to their polymerization, and that the heat content of the C₂, C₃ and C₅ fraction is utilized to indirectly heat the C₄ fraction to the desired temperature for its polymerization, thereby enabling recovery of the polymers separately from each reaction stage.

By operating in accordance with the method outlined in Figure 2 a polymer boiling within the aviation gasoline boiling range can be obtained from the C₂, C₃ and C₅ fractions plus the polymer from C₄ polymerization, which upon hydrogenating and leading with 4 cc. of tetraethyl lead fluid will yield a product having a motor octane number of 99.6. An aviation gasoline fraction can be obtained from the C₄ polymer only, which has a motor octane number of approximately 94 before adding tetraethyl lead, and over 100 motor octane with the addition of 4 cc. of tetraethyl lead.

In accordance with the method described, substantially all the olefins present in stabilizer gas can be utilized in the manufacture of aviation gasoline, thereby greatly increasing the yield of aviation gasoline over that which has heretofore been produced from cracked gases.

In either the process represented by Figure 1 or Figure 2, the order of the depropanizer and the feed debutanizer may be reversed provided the separated fractions are not combined differently than in the manner indicated.

It is claimed:

1. The method of converting stabilizer gases from an oil cracking operation, having the following approximate composition:

| | |
|---|---|
| CH₄ | 6.0 |
| C₂ hydrocarbons | 19.2 |
| C₃ hydrocarbons | 34.2 |
| C₄ hydrocarbons | 35.6 |
| C₅ hydrocarbons | 5.0 | to hydrocarbons boiling within the gasoline range comprising separating said gases into a fraction composed chiefly of C₄ hydrocarbons and a fraction comprised chiefly of C₂, C₃ and C₅ hydrocarbons, subjecting the C₂, C₃ and C₅ fraction to polymerization in the presence of a solid phosphorus acid catalyst in a first zone, heating the C₄ fraction by means of the reaction products from the C₂, C₃ and C₅ polymerization stage and subjecting the C₄ fraction to catalytic polymerization in a second zone in the presence of a solid phosphoric acid catalyst at a temperature lower than the temperature of the zone in which the C₂, C₃ and C₅ fraction is polymerized.

2. Method in accordance with claim 1 in which the C₄ fraction is heated by direct contact with the C₂, C₃ and C₅ polymerization reaction products.

3. Method in accordance with claim 1 in which the C₄ fraction is heated by indirect contact with the C₂, C₃ and C₅ polymerization reaction products.

4. The method in accordance with claim 1 in which unreacted hydrocarbons are recycled to a third catalytic polymerization zone and the temperature in said third zone is intermediate that of said first and second zones.

5. Method in accordance with claim 1 in which unreacted hydrocarbons are recycled in part to the C₂, C₃ and C₅ polymerization zone and in part to the C₄ polymerization zone at a lower temperature than the temperature existing in the respective zone.

6. A process for converting stabilizer gases from oil cracking operations into gasoline-boiling hydrocarbons comprising separating said gases into a C₃ and lighter fraction, a C₄ fraction and a C₅ fraction, heating the combined C₃ and lighter C₅ fractions and contacting the heated fractions at a temperature of approximately 400° to 450° F. under pressure in excess of 300 pounds per square inch with solid phosphoric acid catalyst, cooling the reaction products to approximately 375° to 425° F. by admixture with recycle stock and subjecting the resulting mixture to polymerization at a pressure in excess of 300 pounds per square inch in the presence of solid phosphoric acid catalyst, mixing the hot reaction products from the second polymerization stage wherein the combination of recycle, C₃ and lighter, and C₅ fractions are reacted with the cooler C₄ fraction in order to heat the latter and subjecting the mixture to polymerization at a temperature of approximately 300° to 375° F. and pressure in excess of 300 pounds per square inch in the presence of solid phosphoric acid catalyst, separating unreacted fractions from the resulting polymer and recycling the unreacted fractions as aforesaid.

7. A process for converting cracked stabilizer gases containing olefins having up to 5 carbon atoms in the molecule comprising separating said gas into a C₅ fraction, a C₄ fraction and a fraction containing C₃ and lighter fractions, combining the C₅ and the C₃ and lighter fractions, subjecting the combined fractions to polymerization in the presence of a solid phosphoric acid polymerization catalyst, utilizing the heat content of the reaction products from the aforesaid polymerization step to heat the C4 fraction to polymerization temperature, polymerizing the C4 fraction in the presence of a solid phosphoric acid polymerization catalyst at a temperature below the temperature of the first mentioned polymerization step, separating unreacted hydrocarbons from the reaction products of the polymerization steps and utilizing said unreacted hydrocarbons to regulate the temperature in at least one of the polymerization steps.

8. Process in accordance with claim 7 in which the C4 fraction is heated to reaction temperature by indirect heat exchange with the reaction products from the first polymerization step and the recycle stock is injected directly into the reaction zone in at least one polymerization step.

9. Process in accordance with claim 7 in which the first polymerization step is carried out in the presence of solid phosphoric acid catalyst at 400° to 450° F. and 300 to 1000 pounds per square inch and the second polymerization step is carried out in the presence of solid phosphoric acid catalyst at 300° to 375° F. and 300 to 1000 pounds per square inch.

J. J. STADTHERR.

REFERENCES CITED

The following references are of record in the file of this patent:

UNITED STATES PATENTS

| Number | Name | Date |
|---|---|---|
| 2,171,207 | Boultbee | Aug. 29, 1939 |
| 2,181,640 | Deanesly | Nov. 28, 1939 |
| 2,224,071 | Wassermann | Dec. 3, 1940 |
| 2,245,733 | Subkow | June 17, 1941 |
| 2,308,856 | Borden | Jan. 19, 1943 |
| 2,325,891 | Viland | Aug. 3, 1943 |
| 2,353,832 | Kemp | July 18, 1944 |
| 2,374,095 | Helmers | Apr. 17, 1945 |
| 2,377,411 | Frey | June 5, 1945 |

Certificate of Correction

Patent No. 2,456,338                                December 14, 1948.

JOHN J. STADTHERR

It is hereby certified that error appears in the printed specification of the above-numbered patent requiring correction as follows:

Column 6, line 45, claim 6, after the word "lighter" insert *and*;

and that the said Letters Patent should be read with this correction therein that the same may conform to the record of the case in the Patent Office.

Signed and sealed the 5th day of April, A. D. 1949.

[SEAL]

THOMAS F. MURPHY,
*Assistant Commissioner of Patents.*